United States Patent [19]

Tange et al.

[11] Patent Number: 5,082,607
[45] Date of Patent: Jan. 21, 1992

[54] PROCESS OF PRODUCING POROUS CERAMICS

[75] Inventors: Yoshihiro Tange; Hideaki Matsuda, both of Marugame, Japan

[73] Assignee: Okura Kogyo Kabushiki Kaisha, Japan

[21] Appl. No.: 550,480

[22] Filed: Jul. 10, 1990

Related U.S. Application Data

[63] Continuation of Ser. No. 187,839, Apr. 29, 1988, abandoned.

[30] Foreign Application Priority Data

Apr. 30, 1987 [JP] Japan .................. 62-104829

[51] Int. Cl.$^5$ .............................................. C04B 35/64
[52] U.S. Cl. .......................................... 264/44; 264/63; 264/66
[58] Field of Search .............................. 264/42–44, 264/60–63, 65, 66, 59; 501/82

[56] References Cited

U.S. PATENT DOCUMENTS

| | | | |
|---|---|---|---|
| 2,850,396 | 9/1958 | Fischer | 501/82 |
| 3,256,219 | 6/1966 | Will | 264/41 X |
| 3,390,212 | 6/1968 | Stelle | 264/44 |
| 3,833,386 | 9/1974 | Wood et al. | 501/82 |
| 3,880,969 | 4/1975 | Latos | 501/82 X |
| 3,929,685 | 12/1975 | Jung | 264/41 X |
| 3,988,405 | 10/1976 | Smith et al. | 264/63 |
| 3,998,917 | 12/1976 | Adelman | 264/63 |
| 4,257,810 | 3/1981 | Narumiya | 106/41 |
| 4,452,905 | 6/1984 | Drinkuth et al. | 501/82 X |
| 4,777,153 | 10/1988 | Sonuparlak et al. | 501/82 |

FOREIGN PATENT DOCUMENTS

| | | | |
|---|---|---|---|
| 55-24585 | 2/1980 | Japan . | |
| 7047757 | 3/1982 | Japan | 501/82 |
| 59-83972 | 5/1984 | Japan . | |
| 60-195023 | 10/1985 | Japan . | |
| 0195073 | 10/1985 | Japan | 501/82 |

*Primary Examiner*—Jan H. Silbaugh
*Assistant Examiner*—Karen Aftergut
*Attorney, Agent, or Firm*—Rosenman & Colin

[57] ABSTRACT

A process of producing a porous ceramic by mixing a ceramic powder, a polymerizable unsaturated compund, an emulsifying agent, and water with stirring to provide an inverted emulsion, radical-polymerizing or redox-polymerizing the polymerizable unsaturated compound in the inverted emulsion to cure the inverted emulsion, and, then, drying and firing the cured product thus obtained. The porous ceramics obtained by this invention are useful as filters, adsorbents, catalyst carriers, refractory heat insulating materials, sound absorbers and building materials.

11 Claims, No Drawings

PROCESS OF PRODUCING POROUS CERAMICS

CROSS-REFERENCE

This is a continuation of Ser. No. 187,839 filed Apr. 29, 1988, now abandoned.

FIELD OF THE INVENTION

This invention relates to a novel process of producing porous ceramics useful for filters, adsorbents, catalyst carriers, refractory heat insulating materials, sound absorbers, building materials, etc.

Porous ceramics have excellent functions and features owing to the characteristics thereof originated in the properties as ceramics, such as a heat resistance, a chemical stability, an abrasion resistance, an electric insulating property, etc., and the porosity of porous ceramics and have been practically used.

In general, ceramics are produced by forming a mixture of a ceramic powder, an organic binder, and other additives and then firing it. As the organic binder, acrylic polymers, methyl cellulose, polyvinyl alcohol, polyolefins, and like polymers or oligomers are used. Also, various processes have been proposed for producing porous ceramics.

As a typical process of producing porous ceramics, there is a process of sintering ceramic powders having uniform particle sizes at normal pressure and a process of binding ceramic powders with a binder such as clay, glassy flux, etc. However, since in these processes the pores are mainly formed by voids existing among the powders, the form of the pores is wedge-shaped forms, the porosity thereof is generally from 30 to 50% or less, and also there is a fault that the porosity can not be increased. Also, since the porosity and the size of the pores largely depend upon the sizes of the powder and the particle size distribution of the powders of ceramics, for obtaining a desired porous material, there is a problem that the sizes and the form of the powder of ceramics must be strictly controlled.

In other process, there is a process of firing a product obtained by forming a mixture of a ceramic powder, a binder, and a powder of a combustible material such as starch, a wood meal, a chaff flour, wax, a synthetic resin, carbon etc. Since in this process the pores are mainly formed by the removal of the powder of the combustible materials, from the mixture at firing, the pore sizes depend upon the sizes of the powders of these combustible materials. It is generally difficult to control the size of the powders of these materials and there are problems that obtaining fine powders of these materials is difficult, a large labor is required to obtain powders having uniform sizes, and there is a possibility that the ceramics produced contain ashes as impurities.

For overcoming these problems, there is proposed a process of firing a molding composed of a ceramic powder, a binder dissolved in an organic solvent, and a water-soluble granular material after extracting the organic solvent and the water-soluble granular material in water (Japanese Patent Publication (Unexamined) No. 83972/84). However, in this process, there are also problems that it is difficult to reduce the particle size of the water-soluble material and to control the particle sizes, and also the extraction operation is troublesome.

There is also a process of impregnating a combustible foam with a slurry of a ceramic powder to adhere the ceramic powder to the combustible foam (Japanese Patent Publication (Unexamined) No. 24585/80). In the process, the porous product obtained has a so-called skeleton structure and hence there is a feature that the porosity is large, but on the other hand, there are problems that the strength of the product obtained is weak and the products have large pore sizes.

Moreover, there is also a process of molding a foamed mixture of a urethane prepolymer and a ceramic slurry and then drying and firing the foamed molding thus obtained (Japanese Patent Publication (Unexamined) No. 195073/85). However, this process has a problem that the control of the pore sizes of the product is difficult.

SUMMARY OF THE INVENTION

This invention provides a novel process of producing a porous material without being accompanied by the aforesaid problems and the object of this invention is to provide a process of producing a porous ceramic, capable of producing a porous ceramic having small pore sizes, said pores being continuous pores and uniformly distributed in the whole ceramic body, and also capable of easily controlling the porosity thereof in a wide range.

As the result of various investigations under such circumstances, the inventors have discovered that the aforesaid object of this invention can be attained by forming a water-in-oil type emulsion with a polymerizable unsaturated compound having dispersed therein a ceramic powder as the oil layer, curing the emulsion, evaporating off water from the cured product, and then firing the porous cured product thus obtained and the present invention has been accomplished based on the discovery.

That is, according to this invention, there is provided a process of producing a porous ceramic, which comprises mixing a ceramic powder, a polymerizable unsaturated compound, an emulsifying agent, and water to form a water-in-oil type emulsion (i.e., an inverted emulsion), radical-polymerizing or redox-polymerizing the polymerizable unsaturated compound in the inverted emulsion to cure the emulsion, and drying and firing the cured product obtained.

DETAILED DESCRIPTION OF THE INVENTION

This invention has the feature that a ceramic powder is uniformly dispersed in a polymerizable unsaturated compound and the polymerizable unsaturated compound functions as an oil layer of the inverted emulsion and further functions as a binder for the ceramic powder after being polymerized. Water is uniformly dispersed in the oil layer as droplets thereof to form an inverted emulsion having plasticity. When, after polymerizing the inverted emulsion, water is evaporated off, the evaporated portions remain as spherical pores and hence the cured product becomes porous. When the porous cured product is fired by an ordinary method, the pores formed by the evaporation of water remain as they are and also the organic binder materials are combusted away to form a porous ceramic.

As the ceramic powder for use in this invention, there are alumina, zirconia, magnesia, zinc oxide, tin oxide, iron oxide, titanium oxide, spinel, aluminum hydroxide, magnesium hydroxide, calcium hydroxide, barium carbonate, silicon carbide, silicon nitride, aluminum nitride, etc. However, any other materials having sintering property and capable of forming an inverted emulsion can be also used in this invention without any restriction. Also, the aforesaid materials may be used as a proper mixture thereof or to the aforesaid powder materials may be added a sintering aid such as yttrium oxide, cerium oxide, lithium oxide, borates, silicates, etc., a binder such as a glassy flux, etc., and/or a coloring material.

Polymerizable unsaturated compounds which can cause a radical polymerization or a redox polymerization and can form an inverted emulsion can be used in this invention. Polymerizable monofunctional unsaturated compounds having one polymerizable bond, such as styrene and α-methyl styrene, are useful. When a polymerizable polyfunctional unsaturated compound, such as divinylbenzene, is copolymerized with the monofunctional unsaturated compound, the cured product will be crosslinked. Useful monofunctional unsaturated compounds include styrene, α-methylstyrene, etc.; methacrylic acid esters such as methyl methacrylate, ethyl methacrylate, butyl methacrylate, etc.; methacrylic acid; acrylic acid esters such as methyl acrylate, ethyl acrylate, butyl acrylate, 2-ethylhexyl acrylate, etc.; acrylic acid; vinyl acetate; vinylpyridines; acrylonitrile; maleic anhydride; etc. Useful polyfunctional unsaturated compounds include divinylbenzene, ethylene glycol dimethacrylate, trimethylolpropane trimethacrylate, ethylene glycol diacrylate, trimethylolpropane triacrylate, diallyl phthlate, unsaturated polyesters, etc.

They can be used singly or as a proper combination thereof.

As the emulsifying agent for use in this invention, there are higher fatty acid esters of sorbitan, such as sorbitan tristearate, sorbitan monostearate, sorbitan sesquioleate, sorbitan monooleate, sorbitan monopalmitate, sorbitan monolaurate, etc.; higher fatty acid esters of glycerol or polyglycerol, such as glycerol stearate, polyglycerol oleate, etc.; higher fatty acid esters of polyethylene glycol, such as diethylene glycol stearate, diethylene glycol oleate, polyoxyethylene oleate, etc.; nonionic surface active agents such as polyoxyethylene oleyl ether, polyoxyethylene dodecylphenyl ether, polyoxyethylene nonylphenyl ether, etc.; calcium or magnesium-neutralized products of polyalkylene glycol derivatives having a carboxy group at the terminal end thereof, said polyalkylene glycol derivatives being an addition product of a polyalkylene glycol such as polypropylene glycol, polybutylene glycol, etc., each having a molecular weight of from 1,000 to 10,000 and a dibasic acid anhydride such as succinic anhydride, maleic anhydride, hexahydrophthalic anhydride, etc.; calcium, magnesium or amine-neutralized products of polyester oligomers having a carboxy group at the terminal end thereof, said polyester oligomers produced by alkylene glycol or polyalkylene glycol and a dibasic acid.

Also, any other emulsifying agents having a function of forming an inverted emulsion can be used in this invention without any particular restriction. In the aforesaid emulsifying agents, sorbitan tristearate, sorbitan monostearate, sorbitan sesquioleate, sorbitan monooleate, sorbitan monopalmitate, etc., are particularly preferred in this invention.

These emulsifying agents may be used singly or as a mixture of two or more for obtaining desired effects.

Then, the production process is explained in detail.

In this invention a slurry-form or paste-form inverted emulsion is first formed by mixing a ceramic powder, a polymerizable unsaturated compound, an emulsifying agent, and water and there are various manners of forming the aforesaid emulsions. For example, there are (1) a process of previously mixing a polymerizable unsaturated compound with an emulsifying agent and a ceramic powder and then stirring the mixture while or after adding thereto water, (2) a process of previously adding an emulsifying agent to a polymerizable unsaturated compound and then stirring the mixture while or after adding thereto a slurry obtained by mixing a ceramic powder and water, and (3) a process of simultaneously mixing a ceramic powder, a polymerizable unsaturated compound, an emulsifying agent, and water followed by stirring.

In any processes, the ceramic powder is dispersed in the oil layer. Especially in aforesaid process (2), it was astonishingly confirmed that the ceramic powder is transferred from the slurry into the oil layer.

Mixing and stirring the aforesaid components can be performed by a stirrer having oar-form blades, propeller-form blades, disk-form blades, etc., a mixer such as a ball mill, a pebble mill, a colloid mill, etc., or a kneading machine such as a kneader, a Ponny mixer, a screw extruder, etc. Furthermore, in the case of mixing a ceramic powder, a dispersing agent or a defoaming agent may be, if necessary, used.

About the composition of the inverted emulsion, the composition ratio of the ceramic powder, the polymerizable unsaturated compound, and water is preferably 100:10 to 50:10 to 300 by weight. The composition ratio of water closely relates to the bulk specific gravities of the cured product and the porous ceramic obtained by firing the cured product. That is, if the proportion of water is large, the specific gravity is reduced and the porosity is increased. On the other hand, if the proportion of water is small, the bulk specific gravity and the strength are increased and the porosity is reduced. If the composition ratio of the polymerizable unsaturated compound is smaller, the cured product is more easily fired and the embodiment is economically preferred but in such a case, there are tendencies that the strength of the cured product becomes lower and the viscosity of the inverted emulsion becomes higher.

The proper addition amount of the emulsifying agent is from 5 to 100 parts by weight per 100 parts of the polymerizable unsaturated compound. However, when a neutralized product of an unsaturated polyester oligomer is used as the emulsifying agent, the addition amount thereof may be larger than the aforesaid range with no particular problems since the neutralized product functions as the emulsifying agent and at the same time as a binder.

By radical-polymerizing or redox-polymerizing the polymerizable unsaturated compound in the inverted emulsion, a cured product can be obtained and the polymerization can be ordinarily carried out using a radical polymerization initiator or a redox polymerization initiator. Typical examples of these polymerization initiators are peroxide series polymerization initiators such as hydrogen peroxide, potassium persulfate, ammonium persulfate, benzoyl peroxide, lauroyl peroxide, methyl ethyl ketone peroxide, t-buthylhydroperoxide, etc., and redox polymerization initiators composed of a combination of the aforesaid peroxide series polymerization initiator and a reducing agent such as sodium hydrogensulfite, ferrous salts, dimethylaniline, cobalt naphthenate, sulfinic acid, etc. The amount of the polymerization initiator is preferably from 0.2 to 5 parts by weight per 100 parts by weight of the polymericable unsaturated compound.

It is preferred that the polymerization temperature and the polymerization time are not more than 100° C. and 1 to 48 hours, respectively. There is no particular restriction on the aforesaid polymerization condition but the occurence of striking evaporation of water during the polymerization shall be avoided.

In the cured product obtained by curing the inverted emulsion, water is uniformly dispersed in the product and when the cured product is dried to remove water therein, a porous cured product is obtained. As the drying method, there are hot blast drying, drying by internal heating, vacuum drying, freeze drying, etc. The cured product thus dried can be cut.

When the porous cured product is fired by an ordinary method, the organic materials are first removed by thermal decomposition or oxidative decomposition and then the ceramic powder is sintered or bound to provide a porous ceramic. The firing condition is at least 1000° C. at a temperature raising speed of 1 to 200° C./hr. The factors for determining the firing condition are the kind and particle sizes of the ceramic powder, the kinds and the composition ratio of materials constituting the cured product, the size and the form of the cured product, and the atmosphere in the furnace, and the firing condition may be properly selected considering these factors. In the temperature range of causing the removal of organic materials, it is preferred to perform the firing slowly with a low temperature-raising speed for preventing the occurence of cracks and deformation. In this case, if the cured product has a cross-linked structure, the temperature raising speed in the temperature range can be increased and hence the energy for firing may be less and advantageous. The cross-linkage can be performed by copolymerizing a polyfunctional unsaturated compound.

In the porous ceramics obtained by the process of this invention, the pores are uniformly distributed. The pores are almost spherical or are in the form of spherical pores fused together. The size of the pores is relatively uniform and the size of almost all of the pores is in the range of from 1 to 10 μm but depending upon the production condition, pores larger than ten microns may also be present. After firing, the ceramic powder forms a continuous layer in which the pores are continuous pores.

Then, the invention is explained more practically by the following examples.

EXAMPLE 1

When 30 parts by weight of an aqueous solution of 0.5% by weight ammonium persulfate was gradually added to 130 parts by weight of a mixture obtained by mixing 100 parts by weight of alumina (AES-11, trade name, made by Sumitomo Chemical Co., Ltd.), 24 parts by weight of styrene, and 6 parts by weight of sorbitan sesquioleate by a ball mill while vigorously stirring by a cross-shaped stirring blade, a stable inverted emulsion was obtained. Then, the emulsion was poured in a mold and the polymerization was performed for 24 hours at 60° C. The cured product was taken out from the mold and dried at 60° C. to provide a porous cured product. The cured product was cut into a size of 12.7 mm×6.3 mm×76.2 mm.

Then, the product was placed in an electric furnace, the temperature thereof was raised to 1600° C. at a temperature raising speed of 5° C./hr, and after allowing to stand for 5 hours at the same temperature, the product was cooled to provide a porous ceramic. Neither crack nor deformation was observed on the porous product.

The properties of the aforesaid cured product and the porous ceramic are shown in Table 1 below.

EXAMPLE 2

After previously mixing 100 parts by weight of alumina (AES-22S, trade name, made by Sumitomo Chemical Co., Ltd.) and 100 parts by weight of water by a ball mill, 0.13 part by weight of ammonium persulfate was added to provide a slurry. Then, 200 parts by weight of the slurry thus formed was gradually added to a mixture of 16 parts by weight of styrene, 4 parts by weight of divinylbenzene, and 5 parts by weight of sorbitan sesquioleate while vigorously stirring with a cross-shaped stirring blade to provide a stable inverted emulsion. Then, by following the same procedure as Example 1 except that the temperature raising speed in the firing condition was changed to 50° C./hr., a porous ceramic was obtained. Neither crack nor deformation was observed on the porous product. The properties of the aforesaid cured product and the porous ceramic are shown in Table 1 below.

EXAMPLE 3

By following the same procedure as Example 1 using 121 parts by weight of a mixture obtained by mixing 100 parts by weight of alumina (AES-11, trade name, made by Sumitomo Chemical Co., Ltd.), 16.2 parts by weight of styrene, 1.8 parts by weight of trimethylolpropane trimethacrylate, 2 parts by weight of sorbitan monostearate, and 1 part by weight of a dispersing agent (G-7517, ester type, trade name, made by Dai-ichi Kogyo Seiyaku Co., Ltd.) by a ball mill and 60 parts by weight of an aqueous solution of 0.3% by weight ammonium persulfate, a stable inverted emulsion was obtained. Furthermore, by following the same procedure as Example 1 except that in the firing/condition, the temperature raising speed up to 600° C. was changed to 20° C./hr. and the temperature raising speed from 600° C. to 1600° C. was changed to 50° C./hr., a porous ceramic was obtained. Neither crack nor deformation was observed on the porous ceramic. The properties of the cured product and the porous ceramic are shown in Table 1 below.

EXAMPLE 4

By following the same procedure as Example 1 using 130 parts by weight of a mixture obtained by mixing 100 parts by weight of alumina (AMS-12, trade name, made by Sumitomo Chemical Co., Ltd.), 21.6 parts by weight of styrene, 2.4 parts by weight of trimethylolpropane trimethacrylate, and 6 parts by weight of sorbitan sesquioleate by a ball mill and 200 parts by weight of an aqueous solution of 0.1% by weight ammonium persulfate, a stable inverted emulsion was obtained. Furthermore, by following the same procedure as Example 1 except that in the firing condition, the temperature raising speed up to 1500° C. was changed to 50° C./hr. and the firing temperature was changed to 1500° C., a porous ceramic was obtained. No crack was observed on the porous ceramic but a deformation was partially observed a little. The properties of the aforesaid cured product and the porous ceramic are shown in Table 1 below.

EXAMPLE 5

By following the same procedure as Example 1 using 130 parts by weight of a mixture obtained by mixing 100 parts by weight of zirconia (HSY-3.0, trade name, made by Dai-ichi Kigenso Kagaku Kogyo Co., Ltd.), 21.6 parts by weight of styrene, 2.4 parts by weight of trimethylolpropane trimethacrylate, and 6 parts by weight of sorbitan sesquioleate by a ball mill and 60 parts by weight of an aqueous solution of 0.25% by weight ammonium persulfate, a stable inverted emulsion was obtained. Furthermore, by following the same procedure as Example 1 except that in firing condition, the temperature raising speed up to 500° C. was changed to 10° C./hr., the temperature raising speed of from 500° C. to 1400° C. was changed to 50° C./hr., and the porous cured product was kept at 1400° C. for 2 hours to perform firing, a porous ceramic was obtained. Neither crack nor deformation was observed on the porous product. The properties of the aforesaid cured product and the porous ceramic are shown in Table 1 below.

EXAMPLE 6

By neutralizing 100 parts by weight of an addition derivative obtained by reacting 205.3 parts by weight of polypropylene glycol having a molecular weight of 2053 and 9.8 parts by weight of maleic anhydride in an inert gas for 5 hours at 120° C. with 0.92 part by weight of magnesium oxide, a neutralized product (hereinafter, is referred to as PPGMA(P-Mg)) was obtained. Also, a slurry was prepared by mixing 100 parts by weight of alumina (AES-11, trade name, made by Sumitomo Chemical Co., Ltd.) and 60 parts by weight of water by a ball mill and then adding thereto 0.15 part by weight of ammonium persulfate.

Then, by following the same procedure as Example 2 using 30 parts by weight of a mixture of 21.6 parts by weight of styrene, 2.4 parts by weight of trimethylolpropane trimethacrylate and 6 parts by weight of PPGMA(P-Mg) obtained above and 160 parts by weight of the aforesaid slurry, a stable inverted emulsion was obtained. Furthermore, by following the same procedure as Example 1 except that in the firing condition, the temperature raising speed up to 500° C. was changed to 10° C./hr., the temperature raising speed of from 500° C. to 1500° C. was changed to 30° C./hr., and the porous cured product was kept at 1500° C. for 5 hours to perform firing, a porous ceramic was obtained. Neither crack nor deformation was observed on the porous ceramic. The properties of the aforesaid cured product and the porous ceramic are shown in Table 1 below.

EXAMPLE 7

By following the same procedure as Example 2 using 30 parts by weight of a neutralized product obtained by neutralizing 30 parts by weight of unsaturated polyester which was adjusted by styrene so that nonvolatile components became 50% by weight (POLYSET 1246APL, trade name, made by Hitachi Chemical Co., Ltd.) with 0.37 part by weight of calcium hydroxide and a slurry composed of 100 parts by weight of alumina (AES-11) and 60 parts by weight of water, an inverted emulsion was obtained. After adding, in succession, 0.55 part by weight of a dimethyl phthalate solution of 55% by weight of methyl ethyl ketone peroxide and 0.15 part by weight of cobalt naphthenate to the inverted emulsion obtained above followed by mixing well, the mixture was poured in a mold and the polymerization was carried out for 24 hours at room temperature. After polymerization, the product was taken out from the mold and dried at 60° C. to provied a porous cured product. Then, by following the same procedure as Example 6, a porous ceramic was obtained. Neither crack nor deformation was observed on the porous ceramic. Properties of the aforesaid cured product and the porous ceramic are shown in Table 1 below.

In addition, the fractured surfaces of the cured products and porous ceramics obtained in Examples 1 to 7 were observed by a scanning electron microscope. The results showed that in all the cured products, the ceramic powder was dispersed in the oil layer and further spherical pores having sizes of mainly 1 $\mu$m to 7 $\mu$m were uniformly distributed. However, in the cured product only obtained in Example 3, pores having sizes of several ten microns existed therein. In the porous ceramics obtained after firing, pores were uniformly distributed and the forms thereof were a mixture of almost spherical pores, some of said spherical pores being fused at plural parts thereof.

TABLE 1

| Example | Bulk Specific Gravity | | Bending Strength $(Kg/cm^2)$ | | Water Absorption % | Apparent Porosity % |
| --- | --- | --- | --- | --- | --- | --- |
| | (A)* | (B)** | (A)* | (B)** | | |
| 1 | 1.55 | 2.65 | 93 | 1600 | 10 | 27 |
| 2 | 0.83 | 1.13 | 19 | 78 | 63 | 71 |
| 3 | 1.15 | 1.42 | 14 | 223 | 45 | 64 |
| 4 | 0.51 | 0.62 | 7 | 27 | 135 | 84 |
| 5 | 1.13 | 2.76 | 55 | 546 | 20 | 55 |
| 6 | 1.15 | 1.59 | 73 | 300 | 37 | 59 |
| 7 | 1.17 | 1.83 | 57 | 306 | 27 | 49 |

*Cured Product
**Porous Ceramic

The evaluation items shown in the above Table 1 are as follows.

Bulk specific gravity: $W_1/V$
Water absorption: $(W_2 \times 100)$ (%)
$W_1$: Weight (g) of the sample piece dried at 110° C.
$W_2$: Weight (g) of the sample piece saturated with water. That is, the weight of the sample piece in the state of boiling it in water for 3 hours, withdrawing it from water after cooling, and removing water drops on the surface thereof.
V: Volume ($cm^3$) of the sample piece.
Bending Strength: Three point bending strength ($Kg/cm^2$).
Loading Nose and Support Radii: 5 mm
Test Span: 80 mm for cured product, 50 mm for porous ceramic.
Crosshead Speed: 1.8 mm/min. for cured product, 0.5 mm/min. for porous ceramic.

As described above, the feature of this invention is in the point of utilizing an water-in-oil type emulsion for the formation of porous ceramics and the effects thereof are that the pore size is small, the pores are continuous pores and uniformly distributed in the whole ceramic, the porosity can be desirably controlled, the form of the pores is almost spherical or in the form of spherical pores fused with each other at plural parts, the porous ceramics can be easily obtained, and various porous products can be obtained by changing the composition ratio only. Furthermore, it is industrially advantageous that the cured product can be cut.

The porous ceramics obtained by the present invention are useful as filters, adsorbents, catalyst carriers, refractory heat insulating materials, sound absorbers, building materials, etc.

What is claimed is:

1. A process of producing a porous ceramic, which comprises forming an inverted emulsion having a sinterable ceramic powder in the oil phase thereof from a mixture of (a) an emulsifying agent (b) 10 to 50 parts by weight of a mixture of at least one polymerizable monofunctional unsaturated compound having one polymerizable unsaturated bond and at least one polymerizable polyfunctional unsaturated compound (c) 10 to 300 parts by weight of water and (d) 100 parts by weight of said sinterable ceramic powder, radical-polymerizing or redox-polymerizing said mixture of said polymerizable monofunctional unsaturated compound and said polymerizable polyfunctional unsaturated compound in said inverted emulsion to cure and crosslink said mixture of said unsaturated compounds in said inverted emulsion and thereby form a cured crosslinked product, drying said cured crosslinked product to remove water and thereby form a porous cured product having cell walls comprising said sinterable ceramic powder and an organic binder material formed by said polymerization of said unsaturated compounds, and then firing said porous cured product to combust said organic binder material in said cell walls and to sinter said sinterable ceramic powder in said cell walls to form said porous ceramic.

2. The process of producing a porous ceramic as claimed in claim 1, wherein said porous ceramic comprises pores of from 1 μm to 10 μm, said pores are continuous pores, and said sintered ceramic powder forms a continuous layer.

3. The process of producing a porous ceramic as claimed in claim 1, wherein said porous cured product is fired at a firing temperature of at least 1000° C.

4. The process of producing a porous ceramic as claimed in claim 1, wherein the amount of said emulsifying agent in said inverted emulsion is from 5 to 100 parts by weight per 100 parts by weight of said mixture of said polymerizable unsaturated compounds.

5. The process of producing a porous ceramic as claimed in claim 1, wherein a polymerization initiator exists in said inverted emulsion in an amount of from 0.02 to 5 parts by weight per 100 parts by weight of said mixture of said polymerizable unsaturated compounds.

6. The process of producing a porous ceramic as claimed in claim 1, wherein the polymerization temperature of said polymerizable unsaturated compounds in said inverted emulsion is not more than 100° C.

7. The process of producing a porous ceramic as claimed in claim 1, wherein the polymerization time of said polymerizable unsaturated compounds in said inverted emulsion is from 1 hour to 48 hours.

8. The process of producing a porous ceramic as claimed in claim 1, wherein said porous cured product is fired at a temperature raising speed of from 1 to 200° C./hr. and at a firing temperature of at least 1000° C.

9. A process of producing a porous ceramic, which comprises forming an inverted emulsion having a sinterable ceramic powder in the oil phase thereof from a mixture of (a) an emulsifying agent selected from the group consisting of sorbitan tristearate, sorbitan monostearate, sorbitan monooleate, sorbitan sesquiolate and sorbitan monopalmitate, (b) 10 to 50 parts by weight of a mixture of at least one polymerizable unsaturated compound having one polymerizable unsaturated bond and at least one polymerizable polyfunctional unsaturated compound, (c) 10 to 300 parts by weight of water and (d) 100 parts by weight of said sinterable ceramic powder, radical-polymerizing or redoxpolymerizing said mixture of said polymerizable monofunctional unsaturated compound and said polymerizable polyfunctional unsaturated compound in said inverted emulsion to cure and crosslink said mixture of said unsaturated compounds in said inverted emulsion and thereby form a cured crosslinked product, drying said cured crosslinked product to remove water and thereby form a porous cured product having cell walls comprising said sinterable ceramic powder and an organic binder material formed by said polymerization of said unsaturated compounds said organic binder material in said cell walls and to sinter said sinterable ceramic powder in said cell walls to form said porous ceramic.

10. A process of producing a porous ceramic as claimed in claim 9, wherein said porous cured product is fired at a firing temperature of at least 1000° C.

11. The process of producing a porous ceramic as claimed in claim 9 wherein said polyfunctional unsaturated compound is divinylbenzene, ethylene glycol dimethacrylate, trimethylolpropane trimethacrylate, ethylene glycol diacrylate, trimethylolpropane triacrylate, diallyl phthalate, or an unsaturated polyester.

* * * * *